3,288,676
ANTHELMINTIC PREPARATION
Gabriel Kauzal, 16 West End Flats, Crick Ave.,
Potts Point, New South Wales, Australia
No Drawing. Filed July 29, 1963, Ser. No. 298,418
Claims priority, application Australia, July 29, 1963,
20,634/62
11 Claims. (Cl. 167—53)

This invention has been devised to provide a veterinary preparation including a carrier which is palatable to animals for the purpose of eradicating parasites such as worms in the intestines of animals. More particularly the invention has been devised to provide a simple means of administering an anthelmintic such as phenothiazine by lick or in foods.

In the following description of the invention phenothiazine is referred to generally as the anthelmintic. It is to be clearly understood that the invention is not confined to phenothiazine. Hexachlorethane or thiabendazole alone or in combination together and or with phenothiazine are also effective for the purpose of this invention.

Broadly the veterinary preparation comprises molasses and phenothiazine fused together by heat and made solid by the extraction of liquid therefrom. In one form the mixture is made into a block, hereinafter referred to as a lick, with a solidifying agent, fused together by heat and under a pressure less than atmospheric pressure. In another form the fused (by heat) substance is made as a discrete product, hereinafter referred to as a "dry meal" by the addition of a supplementary foodstuff.

Molasses is intended to include residual sugar syrups or the residual product resulting from the manufacture of starches or gluten from cereals.

While the veterinary preparation of this invention has the great advantage of easy continuous application which has a repeating lethal effect on new intake of parasitic larvae, it has the further great advantage that eggs laid by a female worm are coated with the anthelmintic as they pass through the intestinal tract. These eggs normally hatch in the excrement but when coated with the anthelmintic they become sterile and reinfestation of animals in a grazing area where they have been treated will diminish quickly and will be eventually eliminated. In the case of liver and stomach fluke, this veterinary preparation when consumed regularly as is made practicable by this invention results in the elimination of the pathogenic effect caused by these parasites.

Tests have established that this veterinary preparation by penetrating and passing through an animal render the animal immune or substantially immune to fly strike. These tests have also established that the flesh of animals bred for human consumption is not in any way adversely affected by the preparation.

In the manufacture of a lick the proportion of phenothiazine to molasses is determined for the class of animals to be treated and is of the order of 2.5% to 40% by weight anthelmintic to molasses. The phenothiazine and molasses are made into a substantially colloidal mixture. A solidifying agent added is made as a calcium soap of hydrogenated tallow. The proportion is calculated to supply 100 lbs. of the hydrogenated tallow for each 100 lbs. of molasses. The calcium soap is mixed with the phenothiazine=molasses mixture and the preparation is then raised to a temperature at which the phenothiazine will fuse with the molasses. This temperature can be as high as 185° C. but the temperature and the period the product is subject to heat must not be such as will reduce the feed value of the molasses by decomposing the constituents thereof, i.e., invert sugar fructose, glucose and the like or the anthelmintic. The process is carried out in a vessel maintained at below atmospheric pressure, i.e., 20 to 26 inches of vacuum which is sufficient to produce a colloidal mixture at ambient temperature. Before solidification the product is poured into moulds.

While a lick made as aforesaid has been found stable under various field tests its stability can be increased by first jellying the molasses by the addition of an alginate such as sodium alginate in the proportion of the order of 0.6% by weight. Larger quantities of alginate can be used to accelerate the process of jellying.

In the manufacture of a discrete substance which is in the form a dry meal the proportion of phenothiazine to molasses may be lower than that used in the manufacture of a lick. For example between 1 and 10% by weight has been found to be effective. The phenothiazine and molasses are made into a colloidal mixture. A supplementary food product such as cocoanut meal or pollard or the like is added to the mixture in a proportion which again is determined for the class of animals to be treated. The mixture is heated in a vessel to a temperature, as in the case of a lick, at which the phenothiazine will fuse with the molasses and the meal and the liquid content of the molasses is extracted from the mixture. The product is then ready for use as a palatable dry animal meal.

I claim:
1. A veterinary preparation comprising a substantially colloidal mixture of molasess and an anthelmintic selected from the group consisting of phenothiazine, hexachloroethane, and thiabendazole in a proportion of the order of 2.5 to 40% by weight anthelmintic to molasses, a calcium soap of hydrogenated tallow added thereto and the components are fused together by heat and made solid by the extraction of liquid therefrom, said fusing and liquid extraction being carried out under a vacuum of the order of 20 to 26 inches and at a temperature up to 185° C.

2. A veterinary preparation comprising a substantially colloidal mixture of molasses and an anthelmintic selected from the group consisting of phenothiazine, hexachloroethane, and thiabendazole in a proportion of the order of 2.5 to 40% by weight anthelmintic to molasses and sufficient calcium soap of hydrogenated tallow to supply 100 lbs. of hydrogenated tallow for each 1000 lbs. of molasses and the components fused together under a vacuum of the order of 20 to 26 inches and at a temperature up to 185° C.

3. A veterinary preparation according to claim 2 wherein the molasses is first jellied by the addition of an alginate.

4. A veterinary preparation comprising a substantially colloidal mixture of molasses and an anthelmintic selected from the group consisting of phenothiazine, hexachloroetane and thiabendazole and containing a supplementary food product added thereto and fused therewith by heat under a pressure less than atmospheric pressure, so as to extract liquid from said fused mixture and thereby form a discrete meal.

5. The veterinary preparation of claim 4 wherein the anthelmintic is phenothiazine.

6. The veterinary preparation of claim 4 wherein the anthelmintic is hexachloroethane.

7. The veterinary preparation of claim 4 wherein the anthelmintic is thiabendazole.

8. A veterinary preparation comprising a substantially colloidal mixture of molasses; an anthelmintic selected from the group consisting of phenothiazine, hexachloroethane and thiabendazole; and containing a solidifying agent added thereto and fused together by heat under a pressure less than atmospheric pressure and made into a lick by extraction of liquid therefrom the solidifying agent being a calcium soap of hydrogenated tallow.

9. The veterinary preparation according to claim 8 wherein the anthelmintic is phenothiazine.

10. The veterinary preparation according to claim 8 wherein the anthelmintic is hexachlorethane.

11. The veterinary preparation according to claim 8 wherein the anthelmintic is thiabendazole.

References Cited by the Examiner

McCulloch, J.A.V.M.A., vol. 101, No. 785, August 1942, pages 114 to 119.

Merck Index, seventh edition, 1960, Merck and Co., Rahway, New Jersey, pages 195, 196, 198, 943 and 1010.

JULIAN S. LEVITT, *Primary Examiner.*

FRANK CACCIAPAGLIA, JR., *Examiner.*

SAM ROSEN, *Assistant Examiner.*

UNITED STATES PATENT OFFICE
CERTIFICATE OF CORRECTION

Patent No. 3,288,676 November 29, 1966

Gabriel Kauzal

It is hereby certified that error appears in the above numbered patent requiring correction and that the said Letters Patent should read as corrected below.

In the heading to the printed specification, line 6, for "July 29, 1963" read -- August 2, 1962 --.

Signed and sealed this 12th day of September 1967.

(SEAL)
Attest:

ERNEST W. SWIDER
Attesting Officer

EDWARD J. BRENNER
Commissioner of Patents